UNITED STATES PATENT OFFICE.

JAMES H. STEBBINS, JR., OF NEW YORK, N. Y.

MANUFACTURE OF BROWN COLORING-MATTER.

SPECIFICATION forming part of Letters Patent No. 302,170, dated July 15, 1884.

Application filed March 13, 1884. (Specimens.)

*To all whom it may concern:*

Be it known that I, JAMES H. STEBBINS, Jr., a citizen of the United States, residing at New York, in the county and State of New York, have invented new and useful Improvements in Coloring-Matters, of which the following is a specification.

This invention relates to a brown coloring-matter which I term "phenanthrol brown," and results from the action of diazoazo-benzole-parasulpho-acid upon beta-phenanthrol in alkaline solution.

In carrying out this invention I dissolve 10.3 pounds of amidoazo-benzole-parasulphonate of soda in two hundred pounds water. Then I add thereto a solution of 2.3 pounds pure nitrite of soda in twenty-five pounds water, cool thoroughly, and then heat the above mixture with a solution composed of 6.1 pounds muriatic acid (specific gravity 1.20) and water fifty pounds. The acid should be added very slowly and under constant stirring, and the diazoazo-benzole-parasulpho-acid thus obtained allowed to rest for about two hours. It is then added, under constant stirring, to a solution composed of beta-phenanthrol, six pounds; caustic soda, 2.7 pounds, and water, two hundred pounds. The deep red-brown solution thus obtained is allowed to rest for an hour, then saturated with salt, which precipitates the soda-salt of my new dye-stuff. The precipitate is collected on a filter, dissolved in hot water, reprecipitated with salt, and then dried and pulverized. It dissolves in alcohol with a cherry-red color; is insoluble in ether; it is soluble in acetone with a cherry-red color; dissolves in strong sulphuric acid with a dirty violet color; it is slightly soluble in strong muriatic acid with a brownish color; easily soluble in oxalic acid with a reddish-brown color, and in water with a clear garnet color. Reducing agents—such as tin and hydrochloric acid—will split it up into beta-amido-phenanthrene, aniline, and sulphanilic acid.

What I claim as new, and desire to secure by Letters Patent, is—

As a new product, the brown coloring-matter herein described, which, when treated with reducing agents—such as tin and hydrochloric acid—splits up into beta-amido-phenanthrene, aniline, and sulphanilic acid.

In testimony whereof I have hereunto set my hand and seal in the presence of two subscribing witnesses.

JAMES H. STEBBINS, JR. [L. S.]

Witnesses:
W. HAUFF,
E. F. KASTENHUBER.